United States Patent Office 3,389,171
Patented June 18, 1968

3,389,171
(ALKYLAMINOETHOXY)-DIHALOANILINES AND METHOD OF PREPARATION THEREOF
Halbert C. White and Don V. Wysong, Midland, Mich., assignors to The Dow Chemical Company, Midland, Mich., a corporation of Delaware
No Drawing. Filed Feb. 17, 1965, Ser. No. 433,465
11 Claims. (Cl. 260—501.17)

ABSTRACT OF THE DISCLOSURE

Compounds of the formula

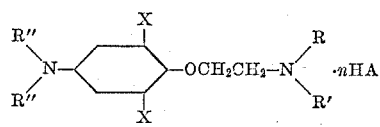

wherein X is halogen selected from the group consisting of chlorine, bromine and iodine, R represents lower alkyl containing 1 to 4 carbon atoms, R' is selected from the group consisting of hydrogen and alkyls containing 1 to 4 carbon atoms and R and R' taken together represent $(CH_2)_5$, R" is selected from the group consisting of hydrogen and methyl, n is selected from 0, 1 and 2 and HA represents a chemical equivalent of a pharmaceutically-acceptable acid, have been found useful as analgesic agents, mild central nervous system depressants and tranquilizers.

---

This invention is concerned with novel chemical compounds and with a method for the preparation thereof and is particularly directed to novel (alkylaminoethoxy)-dihaloanilines and their pharmaceutically acceptable salts.

In accordance with the present invention, there is provided a novel series of 4-(alkylaminoethoxy)-3,5-dihaloanilines and their non-toxic, pharmaceutically acceptable salts, wherein the alkyl substituents contain from one to four carbon atoms and the halogens have atomic numbers greater than 16 and less than 54.

The new compounds may be represented by the formula:

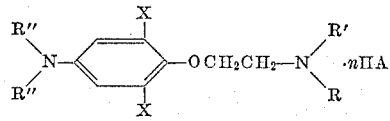

wherein X represents chlorine, bromine or iodine; R represents a lower alkyl group containing one to four carbon atoms; R' represents hydrogen or lower alkyl and R and R' taken together may represent $(CH_2)_5$, forming a piperidine ring with the nitrogen attached thereto; R" represents hydrogen or methyl; n is 0, 1 or 2 and HA represents a chemical equivalent of a pharmaceutically acceptable acid. The new compounds are crystalline solids, soluble in a variety of organic solvents and somewhat soluble in water in the free-base form and readily soluble in water in the salt forms. These compounds have proved useful as analgesic and anti-inflammatory agents. The compounds are also active as mild central nervous system depressants and are useful as tranquilizers.

The alkylamino-ethoxy-dihaloanilines, wherein R" is hydrogen, are prepared by the following series of reactions:

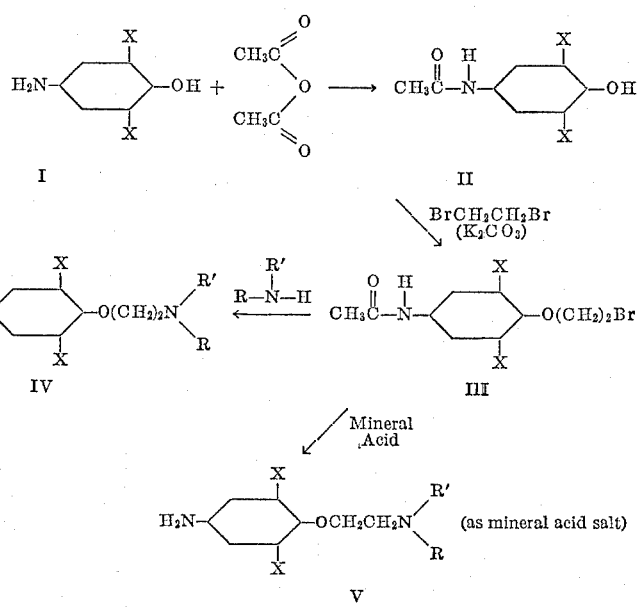

In the foregoing formulae, X, R, and R' have the significance set forth above.

More specifically, a 3,5-dihalo-4-hydroxy-aniline (I) is reacted with acetic anhydride to produce the corresponding 3',5'-dihalo-4'-hydroxy-acetanilide (II). In carrying out this reaction, about one molar proportion of the 3,5-dihalo-4-hydroxy-aniline is suspended in water containing about 10 percent of acetic acid and maintained at a temperature of from about 25° to 30° C. with stirring, while about two molar proportions of acetic anhydride is added thereto dropwise. After about three hours of stirring of the reaction mixture, the latter is neutralized to about pH 6 with aqueous sodium hydroxide solution and the resulting mixture stirred for an additional hour. The desired 3',5'-dihalo-4'-hydroxy-acetanilide precipitates from the reaction mixture and is separated by filtration and washed with water. The intermediates, so-prepared, are crystalline solids and are obtained in nearly quantitative yields based on the amino-phenol starting material.

The 4' - (β-bromoethoxy) - 3',5' - dihalo-acetanilides (III), employed as intermediates, are prepared by reacting one of the 3',5' - dihalo - 4' - hydroxy-acetanilides (II) with ethylene dibromide in an aqueous medium containing a hydrogen bromide acceptor such as an alkali metal hydroxide or carbonate. In a preferred method, the dihalo - 4' - hydroxy-acetanilide is reacted with the ethylene dibromide in an organic solvent, such as acetone, employing an alkali metal carbonate, such as potassium carbonate, as the hydrogen bromide acceptor. In such operations, it is desirable to employ an excess of ethylene dibromide and good results have been obtained when employing from 3 to 5 moles or more of ethylene dibromide per mole of dihalo-hydroxy-acetanilide in the reaction.

The β-bromoethoxy compounds (III) are next reacted with a lower alkyl primary or secondary amine in a suitable solvent such as a lower alkanol to produce the corresponding 4' - (β-mono- or dialkylaminoethoxy) - 3',5'-dihalo-acetanilide (IV). The latter intermediates are readily hydrolysed by heating with an aqueous mineral acid to produce the desired novel (β-alkylaminoethoxy)-dihaloanilines as their mineral acid salts.

By the foregoing reactions, the compounds of the invention are readily obtained in the form of their mineral acid salts depending upon the mineral acid employed in the final hydrolysis step. Thus, for example, the compounds may be obtained as the hydrochloride, hydrobromide or sulfuric acid addition salts by use of hydrochloric, hydrobromic or sulfuric acid, respectively, in the final hydrolysis step. When the alkylamino-alkoxy-dihaloanilines are desired in the free-base form, a mineral acid salt such as the hydrochloride is dispersed in water and the resulting mixture is made alkaline with a strong base, such as sodium hydroxide, and extracted with a water-immiscible, inert organic solvent such as methylene chloride, chloroform or the like. By this procedure, the free-base form of the desired compound is extracted into the organic layer which may then be separated and evaporated to obtain the desired compound.

Other acid addition salts of the compounds of the invention may be prepared by reaction of a pharmaceutically acceptable acid with the free-base form. In one convenient method, one of the alkylamino-alkoxy-dihaloanilines is dissolved in an organic solvent such as methylene chloride and a desired organic acid added thereto in a substantially equimolar proportion. The resulting salt may be separated from the methylene chloride by crystallization or by evaporation of the solvent. Suitable pharmaceutically acceptable organic acids include acetic acid, lactic acid, gluconic acid, fumaric acid, succinic acid, maleic acid, malic acid, glutaric acid, tartaric acid, citric acid and the like. Since the compounds of the invention contain two amine groups of different basicity, salts of said compounds with carboxylic acids usually contain only one equivalent of the carboxylic acid. With strong acids, such as mineral acids, salts with either one or two equivalents of acid can be formed.

The alkylaminoethoxy-dihalo-anilines of the invention wherein R'' is methyl are readily prepared by a series of reactions similar to the foregoing except that the initial acetylation reaction and final hydrolysis reaction are not required. Thus, a 2,6 - dihalo - 4 - (dimethylamino)-phenol is reacted with a molar excess of ethylene dibromide in the presence of a hydrogen bromide acceptor to produce a 4 - (β-bromoethoxy) - 3,5 - dihalo-N,N-dimethylaniline and the latter is reacted in a suitable solvent with a monoalkyl or dialkyl amine to produce the desired novel 4 - (β - alkylaminoethoxy) - 3,5 - dihalo-N,N-dimethylaniline.

It is among the advantages of the invention that the present compounds are effective orally as well as by injection. Particularly for use as analgesic and anti-inflammatory agents, the 3,5 - dibromo - 4 - (β-dimethylaminoethoxy)-aniline and the 3,5 - dichloro - 4 - (β-dimethylaminoethoxy)-aniline and their acid addition salts are preferred.

The following examples illustrate the invention but are not to be construed as limiting the same:

Example 1

4 - amino - 2,6 - dichlorophenol was dispersed in water containing about 10 percent of acetic acid and acetylated by dropwise addition of about 2 molar proportions of acetic anhydride at temperatures of 27°–30° C. with stirring. The reaction mixture was neutralized to pH 6 with aqueous sodium hydroxide solution and the 3',5'-dichloro-4'-hydroxy-acetanilide product separated by filtration. One mole of the latter product, 5.8 moles of ethylene dibromide and 1.14 moles of potassium carbonate were dispersed together in about 3 liters of acetone and the mixture heated at a temperature of about 60° C. under reflux for about 6 hours. The resulting mixture was filtered while hot to remove inorganic salts and the filtrate cooled to crystallize the desired 4' - (β-bromoethoxy) - 3',5'-dichloro-acetanilide product as a crystalline solid melting at 173.5°–174.5° C.

In exactly similar fashion 4 - amino - 2,6 - dibromo-phenol and 4 - amino - 2,6 - diiodo-phenol were acetylated and reacted with ethylene dibromide to produce 4' - (β-bromoethoxy) - 3',5' - dibromoacetanilide (melting at 211°–212° C.) and 4' - (β-bromoethoxy) - 3',5'-diiodo-acetanilide, respectively.

EXAMPLE 2

14.8 grams (0.05 mole) of 2,6-dibromo-4-dimethyl-aminophenol, 9.4 grams (0.056 mole) of potassium carbonate sesquihydrate and 24 milliliters (0.28 mole) of ethylene dibromide were dispersed in 155 milliliters of acetone and the resulting mixture heated with stirring at a temperature of about 60° C. under reflux for about 6 hours. The reaction mixture was filtered while hot to remove inorganic material and the filtrate was concentrated to dryness under reduced pressure to obtain the crude product as a residue. This residue was taken up in 70 milliliters of ethyl alcohol and the resulting mixture cooled and filtered to obtain the 4-(β-bromoethoxy)-3-5-dibromo-N,N-dimethylaniline product as a crystalline solid, melting at 59°–60° C.

EXAMPLE 3

16 grams (0.04 mole) of 4-(β-bromoethoxy)-3,5-dibromo-N,N-dimethylaniline was thoroughly mixed with a solution of 0.35 mole of dimethylamine in 70 milliliters of methanol and the resulting mixture maintained in a stoppered glass vessel at a temperature of 60° C. for a period of 20 hours. Thereafter, solvent and excess dimethylamine were removed from the reaction mixture by evaporation under reduced pressure and the crude product, obtained as a residue, was dissolved in 50 milliliters of isopropyl alcohol. The resulting slurry was filtered to remove insoluble salts. The filtrate from the preceding step was acidified by the addition of 12 milliliters of 5.2 N hydrobromic acid in isopropyl alcohol and cooled to crystallize the desired 3,5-dibromo-4-(β-dimethylamino-ethoxy)-N,N-dimethyl-aniline product as the dihydrobromide salt thereof. The latter was separated by filtration and dried and was found to have a melting point of 210.5°–211.5° C. A weighed portion of the product was titrated electrometrically with Normal potassium hydroxide solution and found to have a molecular weight, based on the neutralization equivalent, of 527 as compared to a theoretical value of 528, calculated for 3,5-dibromo-4-(β-dimethylamino-ethoxy)-N, N-dimethyl-aniline dihydrobromide.

EXAMPLE 4

Following a procedure exactly similar to that of Example 3, 0.05 mole of the 4(β-bromo-ethoxy)-3,5-dibromo-N,N-dimethylaniline compound was reacted with an excess (0.33 mole) of n-butylamine in 70 milliliters of methanol for a period of 48 hours at 60° C. and the resulting product worked up as in Example 3 to obtain 3,5 - dibromo - 4(β - n-butylamino-ethoxy)-N,N-dimethyl-aniline dihydrobromide as a crystalline solid melting at 184°–186° C. This product had a molecular weight, based on the neutralization equivalent by titration, of 556 as compared to a theoretical value of 556 calculated for the named compound.

EXAMPLE 5

262 grams (0.8 mole) of 4-(β-bromo-ethoxy)-3,5-dichloroacetanilide, 270 milliliters of methanol and 630 milliliters of a 7.5 Normal solution of dimethylamine in methanol (containing 4.73 moles of dimethylamine) were mixed together in a two liter stainless steel bomb. The bomb was closed and heated with rocking for 19 hours at temperatures of 75° to 80° C. Thereafter, the reaction mixture was cooled, treated with activated charcoal and filtered. The filtrate was collected and evaporated under reduced pressure while heating until the pot temperature reached about 50° C. under a pressure of about 10 millimeters of mercury. The crude product obtained as a residue was taken up with a mixture of 900 milliliters of water and 900 milliliters of methyl isobutyl ketone. This mixture separated into two layers on standing. The methyl isobutyl ketone layer was separated and the solvent evaporated therefrom under reduced pressure. The resulting residue was dissolved in 1480 milliliters of 1 N hydrochloric acid solution and the resulting solution was washed with methyl isobutyl ketone. The aqueous solution was made alkaline with 298 millimeters of 5 N sodium hydroxide solution to precipitate the desired intermediate product. The resulting slurry was filtered and the separated solid dried to obtain 3′,5′-dichloro-4′-(β-dimethylaminoethoxy) acetanilide having a melting point of 122°–123° C. 0.55 gram-mole of the latter intermediate was heated with a molar excess (665 milliliters) of 5 N hydrochloric acid solution with stirring and under reflux at a temperature of about 105° C. for five hours. The reaction mixture was cooled in a refrigerator overnight to precipitate the 3,5-dichloro-4-(β-dimethylaminoethoxy) aniline dihydrochloride salt, as a crystalline solid. The latter was isolated by filtration and dried and was found to have a melting point of 222°–223° C. and a molecular weight of 324, based on the neutralization equivalent by titration against standard base, as compared to a theoretical value of 322 calculated for the named compound.

EXAMPLE 6

The essential procedure of Example 5 was repeated except that 0.27 gram-mole of 4′(β-bromoethoxy)-3′,5′-dichloro-acetanilide and a solution of 1.51 gram-moles of diethyl amine in 400 milliliters of methanol were mixed in a stoppered glass vessel and the mixture heated at about 60° C. for 4 hours. The 4′-(β-diethylamino-ethoxy)-3′,5′-dichloro-acetanilide intermediate was obtained in the form of a hygroscopic solid. 0.27 gram-mole of the latter was hydrolysed by heating for one hour with 750 milliliters of aqueous 5 N hydrochloric acid solution to obtain the 4-(β-diethylamino-ethoxy)-3,5-dichloroaniline dihydrochloride product as a crystalline solid melting at 206°–207° C.

EXAMPLE 7

30 grams (0.072 mole) of 4′-(β-bromoethoxy)-3′,5′-dibromo-acetanilide, 100 milliliters of 5 N dimethylamine solution in methanol (containing 0.5 mole of dimethylamine) and 70 milliliters of methanol were mixed thoroughly in a stoppered Pyrex glass vessel and the mixture maintained at a temperature of about 60° C. for 40 hours. The reaction mixture was cooled and then concentrated under reduced pressure (about 15 millimeters of Hg) while warming to a final pot temperature of 50° C. The resulting residue was taken up in a mixture of 100 milliliters of methylene chloride and 100 milliliters of water. The methylene chloride layer was separated and evaporated to dryness to yield the crude intermediate product as a residue. The latter was dissolved in 100 milliliters of aqueous 1 N hydrochloric acid solution and the intermediate product reprecipitated by making the solution alkaline after washing same with methylene chloride. The 4′-(dimethylamino-ethoxy)-3′,5′-dibromo-acetanilide intermediate product was a crystalline solid melting at 143°–146° C. The acetanilide compound was hydrolysed by heating with excess 5 N hydrochloric acid as in Example 5 to obtain the desired 4(β-dimethylaminoethoxy)-3,5-dibromo-aniline as the dihydrochloride melting at 234°–236° C. and having a molecular weight of 412, based on the neutralization equivalent by titration, as compared to 411 calculated by theory for said dihydrochloride.

EXAMPLE 8

The dihydrochloride salt of Example 5 or of Example 7 is taken up in aqueous sodium hydroxide solution and the resulting mixture extracted with methylene chloride. The methylene chloride extract is dried and evaporated to obtain the corresponding substituted aniline compounds in the free base form. The latter were white solids, as follows: 4-(β-dimethylamino-ethoxy)-3,5-dichloro-aliline, melting at 83°–84.5° C., and 4-(β-dimethylamino-ethoxy)-3,5-dibromo-aniline, melting at 96–97.5° C., respectively.

EXAMPLE 9

Following the general procedure of Example 7, 0.05 mole portions of 4′-(β-bromoethoxy)-3′,5′-dibromo-acetanilide were reacted with a molar excess of diethylamine (in methanol) and with a molar excess of piperidine (in ethanol) to produce, respectively, 4′-(β-diethylamino-ethoxy)-3′,5′-dibromo-acetanilide and 4′-(β-1-piperidinylethoxy)3′,5′-dibromo-acetanilide, the latter melting at 146–147° C. Hydrolysis of the diethylamino-ethoxy compound, with hydrochloric acid as in the preceding examples, produced the 4-(β-diethylamino-ethoxy)-3′,5′-dibromo-aniline dihydrochloride as a crystalline solid, melting at 181–183° C. and having a molecular weight of 438, based on the neutralization equivalent by titration, as compared to a theoretical value of 439 calculated for this compound. Hydrolysis in like manner of the piperidinyl-ethoxy compound gave 4-(β-1-piperidinylethoxy)-3,5-dibromo-aniline dihydrochloride as a crystalline solid, melting at 217.5°–218.5° C.

EXAMPLE 10

To a methylene chloride solution of one molar proportion of the free base form of 4-(β-dimethylamino-ethoxy)-3,5-dibromo-aniline, prepared as in Example 8, is added a solution of one molar proportion of maleic acid in 1,2-dimethoxy-ethane with vigorous stirring to produce the 4-(β-dimethylamino-ethoxy)-3,5-dibromoaniline maleate salt as a fine crystalline precipitate. The latter is separated by filtration and dried. This maleate salt has a melting point of 146°–147.5° C. Other pharmacologically acceptable organic acids can be substituted for maleic acid above to produce the corresponding salts.

EXAMPLE 11

The procedure of Example 10 was repeated except that 4-(β-dimethylamino-ethoxy)-3,5-dichloroaniline was employed instead of the corresponding dibromo compound to produce 4-(β-dimethylaminoethoxy)-3,5-dichloroaniline maleate as a crystalline solid, melting at 130–131° C.

EXAMPLE 12

0.098 gram-mole of 4-amino-2,6-diiodophenol was acetylated with acetic anhydride to prepare 3′,5′-diiodo-4′-hydroxy-acetanilide. The latter was mixed with 47 milliliters (0.545 mole) of ethylene dibromide and 18.1 grams (0.11 mole) of potassium carbonate sesquihydrate in 306 milliliters of acetone and the mixture heated at 60° C. under reflux for 6 hours. The mixture was worked up as in Example 1 to obtain the 4′-(β-bromoethoxy)-3′,5′-diiodoacetanilide. 0.025 gram-mole of the latter was reacted with a solution of 0.3 gram-mole of dimethylamine in 60 milliliters of methanol following the procedure of Example 6 to produce the 4′-(β-dimethylamino-ethoxy)-3′,5′-diiodoacetanilide. This acetanilide compound was hydrolyzed with 70 milliliters of 5 N hydrochloric acid and the product recrystallized to obtain 4(β-dimethylaminoethoxy)-3,5-diiodoaniline dihydrochloride as a white solid, melting at 232°–233° C.

It will be noted that certain of the acetanilide intermediates, particularly the β-bromoethoxy and β-alkylaminoethoxy compounds, employed in producing the novel susbstituted anilines of the invention, are themselves novel and useful compounds.

The compounds of the invention are particularly useful for studying and controlling the behavior of animals such as mice, rats, cats and monkeys. Thus intravenous administration to anaesthetized cats of dilute solutions in physiological saline solution of 4-(β-dimethylamino-ethoxy)-3,5-dichloroaniline dihydrochloride, 4-(β-dimethyl-amino-ethoxy-3,5-dibromoaniline dihydrochloride or 4-(β-butylamino-ethoxy)-3,5-dibromoaniline dihydrochloride at a dosage of 4 milligrams of the respective compound per kilogram of animal depressed the polysynaptic jaw reflex and demonstrated centrally acting muscle relaxant properties. Rats conditioned to avoid electric shock or to obtain a food reward following a signal had the conditioned behavior eliminated or markedly depressed by intraperitoneal dosages of from 5 to 40 milligrams per kilogram of representative compounds of the invention. Oral doses of from about 10 to 40 milligrams per kilogram of the dihydrochloride, hydrochloride or maleate salts of 4-(β-dimethylamino)-3,5-dichloroaniline or of the corresponding dibromo compound administered to mice gave analgesic protection against the writhing normally induced by subsequent intraperitoneal injection of 10 mg./kg. of hydrochloric acid administered in the form of an aqueous 0.1 percent (weight/volume) solution thereof. This analgetic action was of a non-narcotic type and did not involve anaesthesia as detected, for example, by heat applied to the feet. The compounds further showed anticonvulsant activity in protecting mice against electroshock.

We claim:
1. A compound having the formula

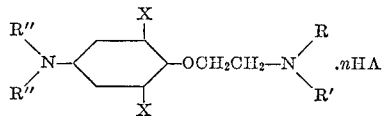

wherein X is halogen selected from the group consisting of chlorine, bromine and iodine, R represents lower alkyl containing 1 to 4 carbon atoms, R' is selected from the group consisting of hydrogen and alkyls containing 1 to 4 carbon atoms and R and R' taken together represent $(CH_2)_5$, R" is selected from the group consisting of hydrogen and methyl, $n$ is selected from 0, 1 and 2 and HA represents a chemical equivalent of a pharmaceutically acceptable acid.

2. A 4-(β-dialkylaminoethoxy)-3,5-dibromoaniline wherein the alkyl groups contain from 1 to 4 carbon atoms.

3. A 4-(β-dialkylaminoethoxy)-3,5-dichloroaniline wherein the alkyl groups contain from 1 to 4 carbon atoms.

4. 3,5-dibromo-4-(β-dimethylamino-ethoxy)-N,N-dimethyl aniline.

5. 3,5-dibromo-4-(β-n-butylamino-ethoxy)-N,N-dimethyl aniline.

6. 3,5-dibromo-4-(β-dimethylamino-ethoxy)-aniline.

7. 3,5-dibromo-4-(β-diethylamino-ethoxy)-aniline.

8. 3,5-dibromo-4-(β-dimethylamino-ethoxy)-aniline maleate.

9. 3,5-dichloro-4-(β-dimethylamino-ethoxy)-aniline.

10. 3,5-dichloro-4-(β-diethylamino-ethoxy)-aniline.

11. 3,5-dichloro-4-(β-dimethlyamino-ethoxy)-aniline maleate.

References Cited

UNITED STATES PATENTS

| | | | |
|---|---|---|---|
| 2,683,719 | 7/1954 | Kerwin et al. | 260—570.7 |
| 2,765,338 | 10/1956 | Suter et al. | 260—570.7 |
| 3,133,075 | 5/1964 | Clinton et al. | 260—570.7 |
| 3,201,401 | 8/1965 | Krapcho | 260—562 |
| 3,235,597 | 2/1966 | Mills et al. | 260—570.7 |

FOREIGN PATENTS 500,675  2/1951  Belgium.

BERNARD HELFIN, *Acting Primary Examiner.*

LORRAINE A. WEINBERGER, RICHARD K. JACKSON, LEON ZITVER, *Examiners.*

M. WEBSTER, ALBERT P. HALLUIN, M. W. GLYNN, *Assistant Examiners.*